Patented June 24, 1952

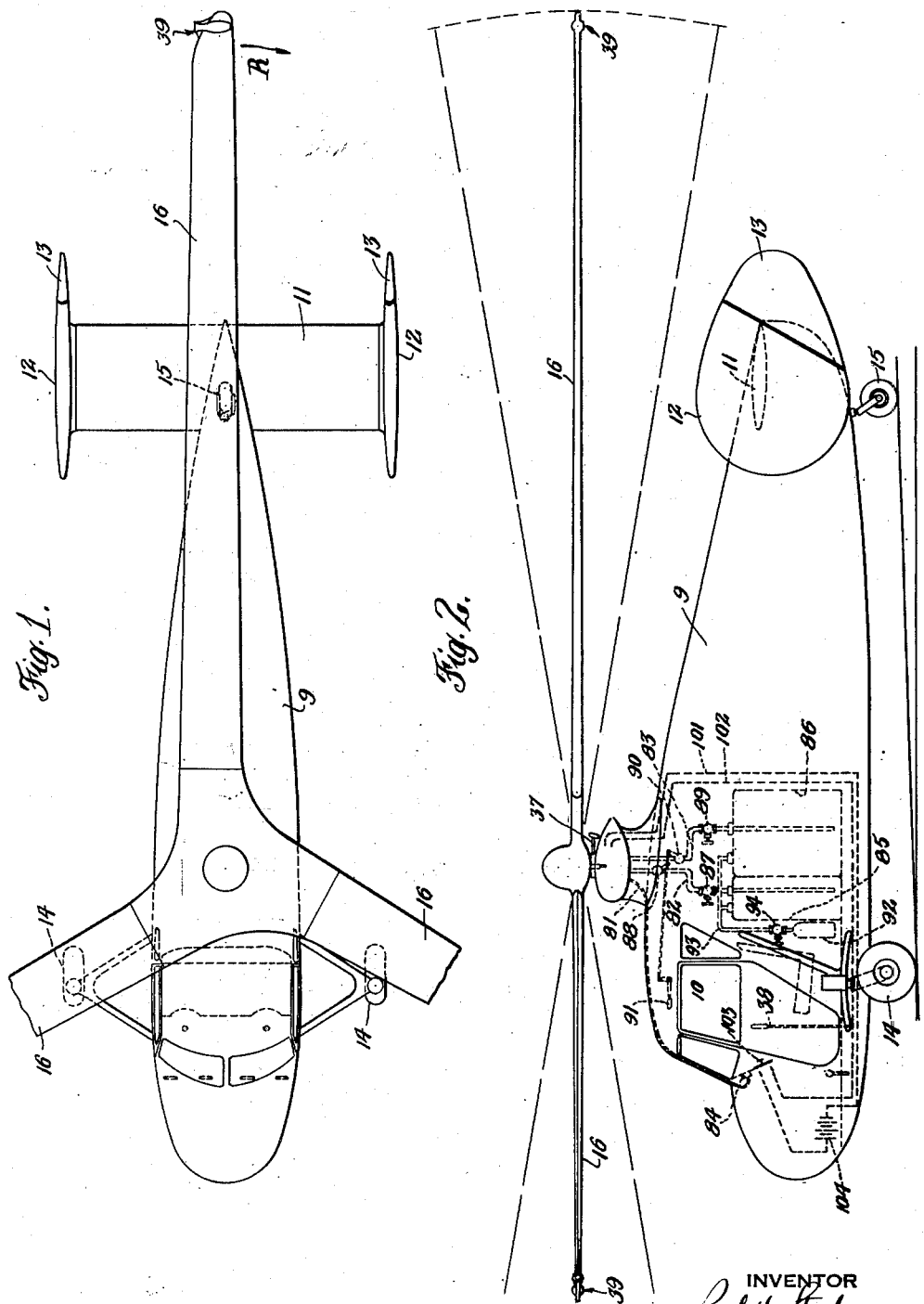

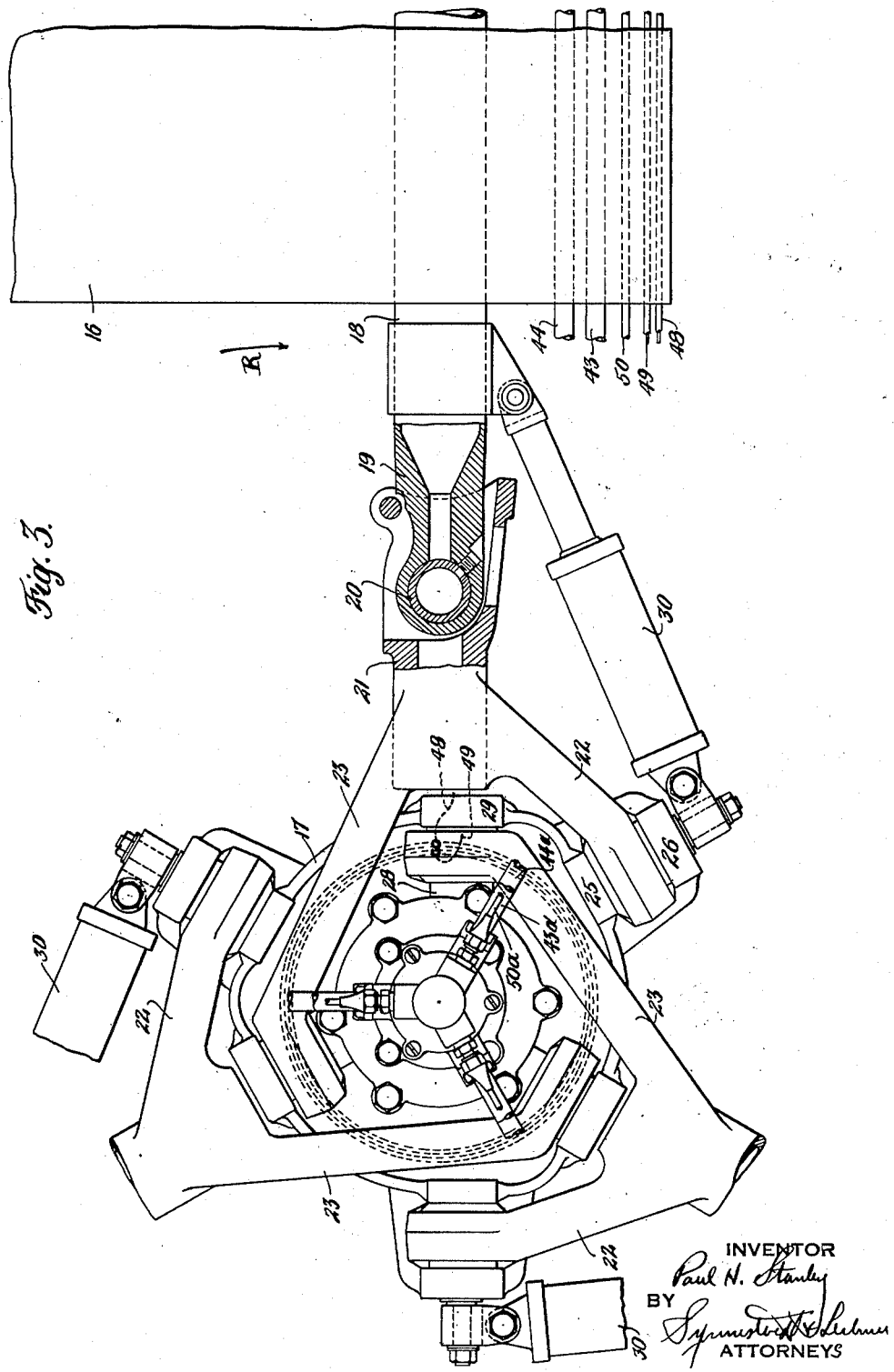

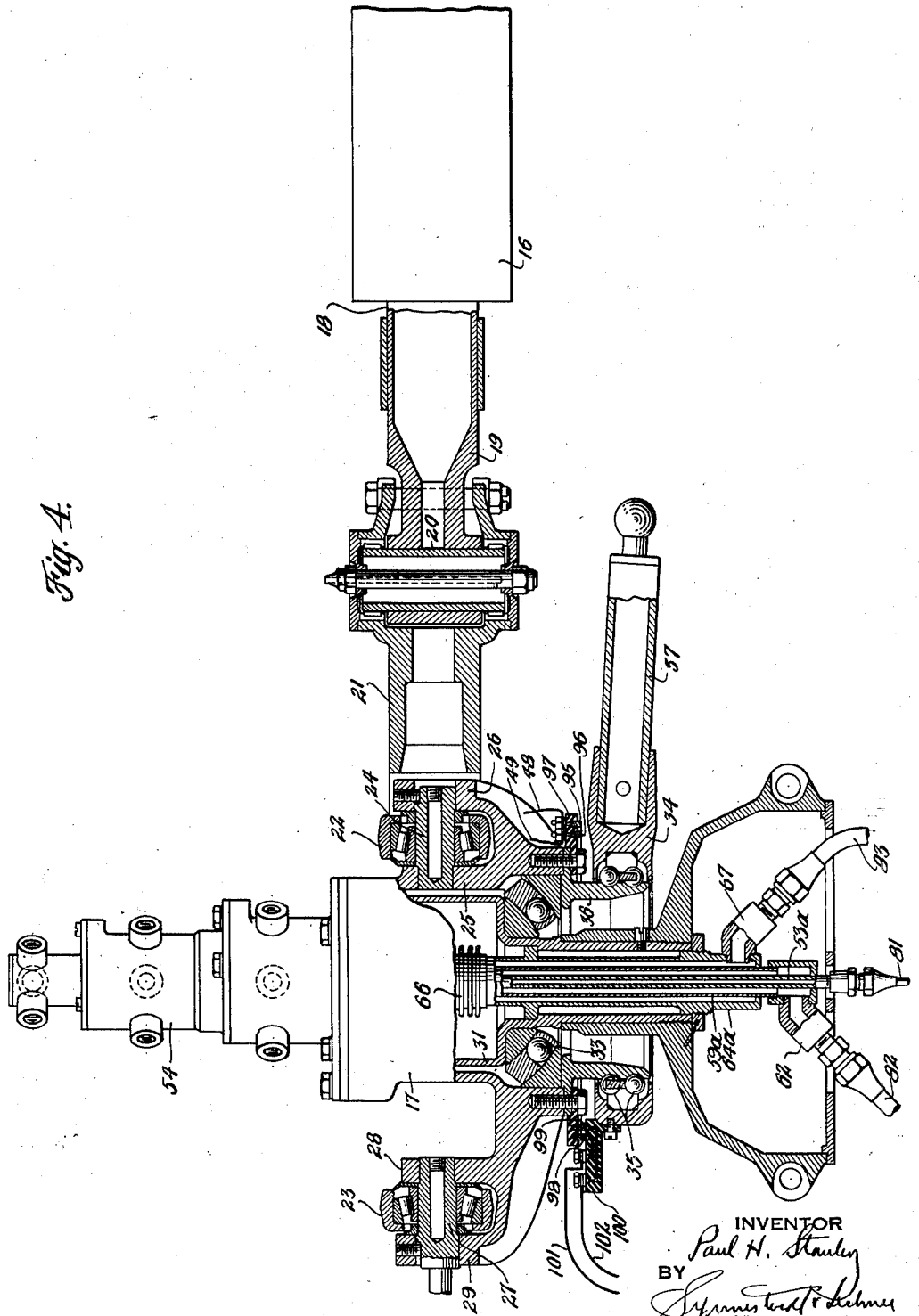

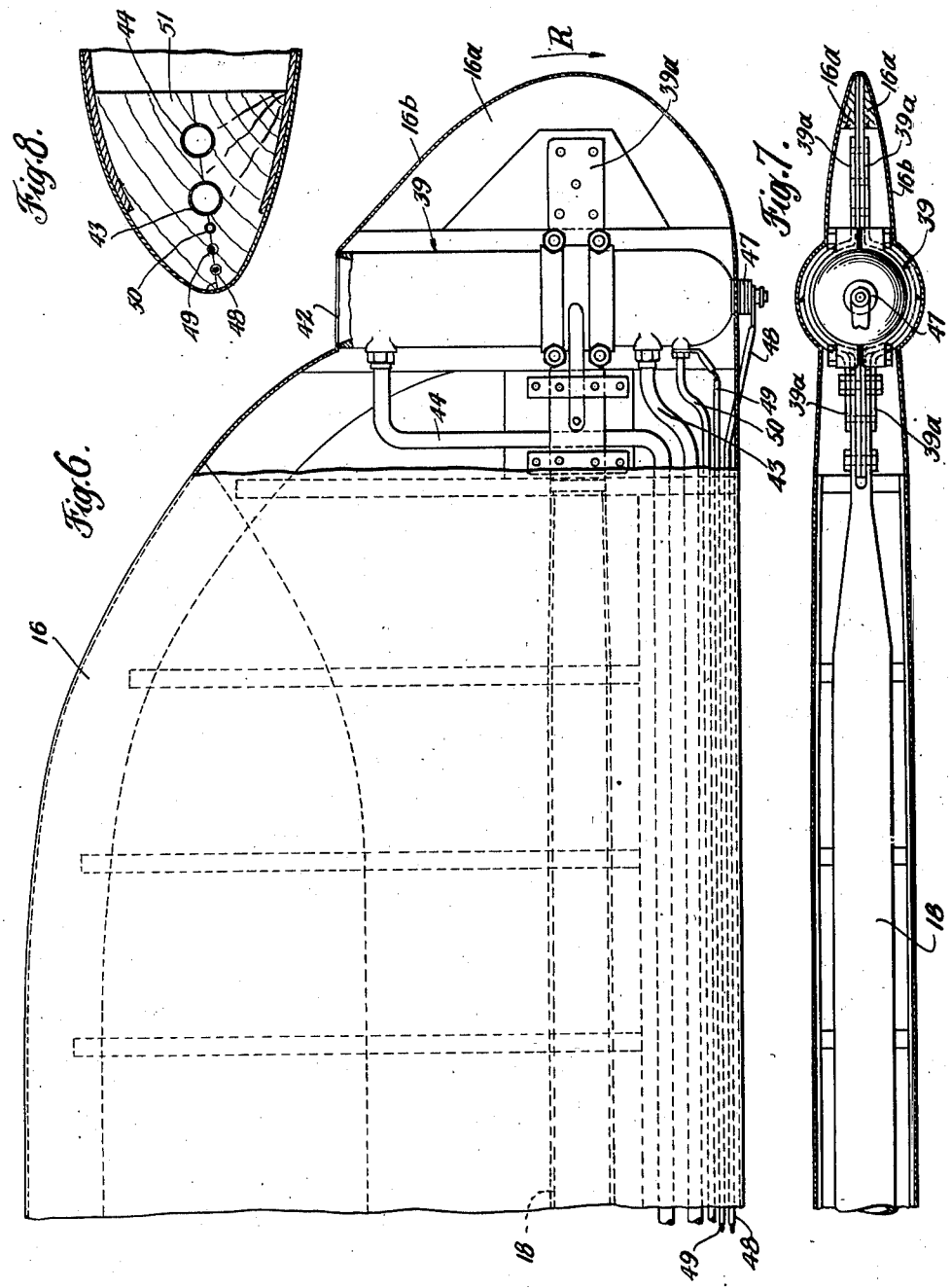

2,601,463

UNITED STATES PATENT OFFICE 2,601,463

JET DRIVEN ROTOR BLADE STRUCTURE

Paul H. Stanley, Huntingdon Valley, Pa., assignor to Autogiro Company of America, Philadelphia, Pa., a corporation of Delaware Application February 26, 1946, Serial No. 650,213

1 Claim. (Cl. 170—135.4)

This invention relates to rotor-equipped aircraft and is particularly concerned with rotor-equipped aircraft in which the rotor is capable of both autorotative and driven actuation.

One of the primary objects of the invention is the provision of a novel sustaining rotor system incorporation blades equipped with jet reaction devices, preferably adjacent the blade tips by which driven actuation of the rotor may be effected, the rotor also being capable of auto- rotative actuation. With an aircraft arranged in this manner, even during driven actuation of the rotor, no torque counteracting system is required, as a result of which the aircraft is appreciably simplified.

Beyond the foregoing the invention contemplates construction of the rotor and of the jet drive mechanism in a manner providing for jet actuation of the rotor at a speed very much greater than the speed contemplated for auto- rotational operation. At the same time, according to the invention, the rotor blades are connected with the rotative hub in a manner providing automatically for alteration of rotor blade pitch angle with alteration in the coning angle of the rotor blades. These two features (change of pitch automatically with coning and large R. P. M. differential between conditions of drive and autorotation) mutually contribute to the attainment of a number of advantageous operating characteristics, including automatic shift of blade pitch angle as between values appropriate for driven operation of the rotor and for autorotational operation of the rotor, and including further a high blade tip speed during jet operation, which is of importance from the standpoint of efficiency of the jet drive.

According to another important aspect of the invention, the rotor blade mountings which provide for automatic pitch change with change in coning angle are arranged so as to transmit pitching or torsional moments from the blades to the hub as a result of which such pitching or torsional moments as between blades are balanced out in the hub itself. The blade mounting contemplated, moreover, is such as to secure the required change in blade pitch angle as between the conditions of autoration and jet drive, without the employment of pitch change mountings or journals having their axes coincident with the longitudinal axes of the blades. This is of particular advantage in a rotor system of the present invention, because of the high rotational speed contemplated during jet drive of the rotor. Such high rotational speed is naturally accompanied by correspondingly increased centrifugal loads on the blade mountings. With the rotor system of the present invention, therefore, it is not necessary to employ a thrust bearing directly carrying the high centrifugal loads incident to the high R. P. M. of the rotor during jet operation.

As a still further feature of the invention, it is pointed out that the invention contemplates employment of a rotor control system for maneuvering, other than that type requiring manually controllable cyclical blade pitch variation, the control preferably being secured by mounting the hub as a whole with freedom for tilting movement in all directions. In this way (the torsional or pitching moments as between blades being balanced out or neutralized, in the hub itself), the control system is not subject to the fluctuating and sometimes heavy loads which would otherwise be encountered with the type of control system employing cyclic pitch variation, particularly when the rotor is being jet driven at the high rotational speed contemplated. Such loads can cause detrimental vibration in the control system and in the aircraft.

Certain features of rotor blade construction and of the construction and mounting thereon of a jet driving device are claimed herein; while other inventive features disclosed herein are claimed in my co-pending divisional application Serial No. 255,030, filed November 6, 1951.

The accomplishment of the foregoing general purposes and objects requires the meeting of certain problems which can best be understood following a description of an illustrative embodiment of the invention as shown, for example, in the accompanying drawings, in which:

Figure 1 is a top plan view of an aircraft provided with a rotor system according to the present invention, the rotor here shown being three-bladed, with two of the blades broken off for compactness of the figure;

Figure 2 is a side view in outline showing the aircraft of Figure 1, with certain devices with which the aircraft is equipped shown in dotted lines as will further appear;

Figure 3 is a plan view to an enlarged scale of the rotor head assembly, omitting the streamlining or shroud shown in Figures 1 and 2 as enclosing the rotor head and blade roots, and with an illustration of a connected blade, portions of the mounting for this blade being shown in horizontal section;

Figure 4 is a side view, partly in elevation and partly in vertical section, illustrating the rotor head, blade mounting and associated parts of Figure 3;

Figure 6 is a fragmentary view to an enlarged scale showing the tip end of one of the rotor blades, with a portion of the blade tip covering broken away to disclose the jet reaction device mounted therein;

Figure 7 is a view taken in longitudinal vertical section through the portion of the blade tip shown in Figure 6, with certain parts of the blade structure and with certain parts of the jet devices shown in elevation; and Figure 8 is a further enlarged transverse vertical sectional view through the nose portion of the blade shown in Figures 6 and 7.

Figure 5:
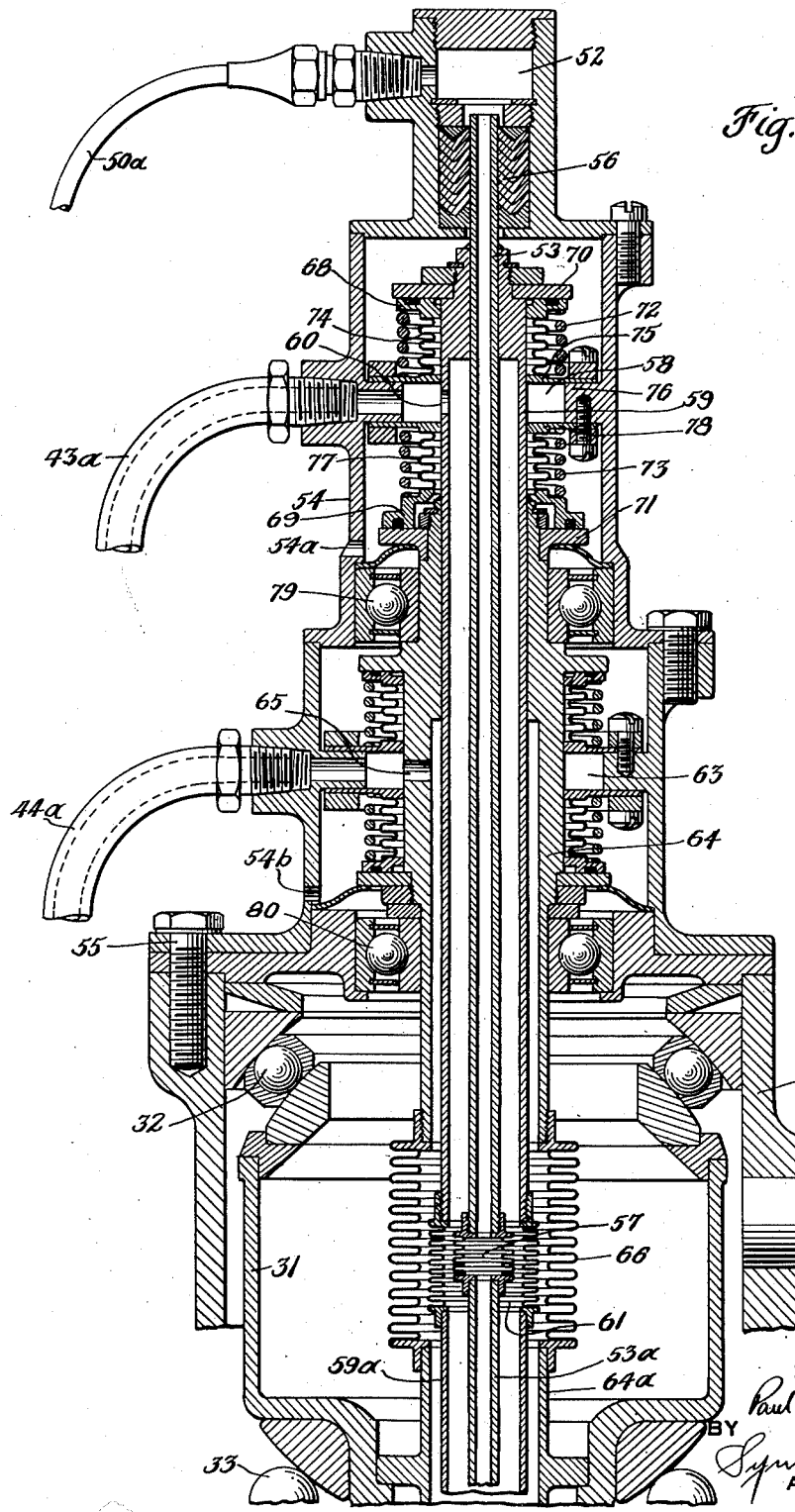
Figure 5 is a vertical sectional view on a further enlarged scale through the upper portion of the rotor head assembly.

In considering the drawings, reference is first made to the general arrangement of the aircraft as illustrated in Figures 1 and 2. As there shown the body or fuselage of the aircraft 9 is provided with a cabin 10 for the pilot and occupants, an empennage being arranged at the tail and including a horizontal stabilizer surface 11, vertical stabilizer surfaces 12—12 and controllable rudders 13—13. In the particular craft illustrated the undercarriage includes a pair of landing wheels 14—14 and a tail wheel 15.

In the embodiment of Figures 1 and 2, the rotor incorporates three blades 16, although it will be understood that any desired number of blades may be employed. Each blade is connected, at its root end, with an autorotative hub structure 17 in the manner best illustrated in Figures 3 and 4. As there shown the root end 18 of the main spar of each blade is provided with a vertically apertured fitting 19 adapted to cooperate with an upright pivot pin 20, which constitutes a "drag" pivot for the blade, defining a pivot axis about which the blade may swing in the lag-lead sense. The pivot 20 is carried by an extension 21 projecting radially outwardly from the base of a blade mounting fork comprising fork prongs 22 and 23. The prongs 22 and 23 project inwardly to embrace the hub, the forks for the three blades being interfitted, when viewed in plan, as is clearly illustrated in Figure 3. The prong 22 of each fork is provided with an apertured eye at its inner end adapted to cooperate with a pivot pin 24, the ends of which pin are carried in apertures formed in supporting parts 25 and 26 of the rotative hub structure. Similarly, the inner end of prong 23 of each fork is provided with an apertured eye cooperating with a pivot pin 27 carried by supporting parts 28 and 29 of the hub structure. The axes of the two pivots 24 and 27 are arranged in alignment with each other and provide a "flapping" pivot axis passing close to the axis of rotation of the rotor hub at an appreciable oblique angle with reference to the longitudinal or radial axis of the connected blade. When viewed in plan, as in Figure 3, the flapping pivot axis forms an acute angle (hereinafter referred to as the delta-3 angle) at the outer side of the pivot axis and at the leading side of the longitudinal axis of the blade. Note that the direction of rotation of the rotor is indicated by the arrow R in Figures 3 and 1. In consequence of this obliquity, the pitch angle of the blade 16 is reduced when the blade flaps upwardly on the "delta" pivot axis. The employment of a delta-3 obliquity for a flapping pivot is of importance in this invention, as will further appear.

For the purpose of controlling lag-lead displacements of each blade about its drag pivot 20, a blade movement control or damper device indicated at 30 is arranged to react between the hub structure and the root end of the blade spar 18. The details of this mechanism need not be considered herein since they form no part of the present invention per se.

Referring now more particularly to Figures 4 and 5, it will be seen that the rotative hub structure 17 is mounted on a nonrotative hub support 31 by means of upper and lower series of ball bearings 32 and 33 having spherical races, which therefore provide not only for rotation of the rotative hub structure about a generally upright axis but also for freedom for tilting movement of the rotative hub structure in any plane. A hub mechanism of this type is more fully described in Larsen Patent 2,264,942, issued December 2, 1941.

Means are provided for effecting tilting of the hub for control of the aircraft in longitudinal and lateral planes, i. e., in pitch and in roll. In the form of hub illustrated the control mechanism includes a nonrotative ring 34 which is mounted by means of bearings 35 on the cylindrical member 36 which depends from the rotative hub structure 17. Control arms, one of which appears at 37 in Figures 2 and 4 are connected with the ring and extend therefrom at right angles to each other. Any suitable linkage or motion transmitting connections may be employed to interconnect the control arms with a suitable pilot's control organ, such, for example, as the usual stick indicated at 38 in Figure 2. As is understood in this art, the connections between the stick 38 and the tiltable hub are arranged so that upon forward movement of the control stick the hub is caused to tilt downwardly at the forward edge, and upon rearward movement of the control stick the hub is caused to tilt downwardly at the rear edge. Similarly, right and left hand movements of the control stick cause the rotor to tilt downwardly at the right hand side and at the left hand side, respectively. Since these control connections form no part of the present invention per se, they need not be considered in detail herein.

The jet drive system for the rotor preferably incorporates a jet device at the tip of each blade, as indicated at 39 in Figures 1, 2, 6 and 7. The specific form of the blade tip jet devices is of no consequence to the present invention, since any of a variety of jet systems may be utilized. Therefore the details of the jets need not be described herein. It is mentioned, however, in Figure 6, that the discharge orifice of the jet is indicated at 42. Connections which are extended to the jet to provide fuel and the like for combustion purposes in the jet are described below.

A fuel, such as alcohol, is supplied to the jet device through a connection 43 and liquid oxygen is also supplied through a connection 44. An ignition system is provided, including a spark plug 47, an electrical connection 48 being associated with the plug and a return or ground wire 49 with the body of the jet device itself. A fluid pressure connection 50 is arranged to communicate with the interior of the jet device and this connection, as will further appear, is employed to secure a gauge reading of the pressure in the device.

The jet device 39 as a whole is securely fastened to the outer end of the longitudinal spar tube 18 of the blade. For this purpose straps 39a are secured to a flattened terminal portion of the spar 18, the straps being extended outwardly around the jet device as best seen in Figure 7. The outer ends of the straps 39a may also be employed to carry internal blade tip members 16a over which the tip covering 16b is applied, this covering extending inwardly to enclose the jet device 39, as clearly shown in Figure 7. Although the jet device is appreciably elongated chordwise of the blade, from Figure 6 it will be noted that the jet device is positioned to extend in part ahead of and in part to the rear of the line of the main spar 18 of the blade. This is of advantage in bringing the center of gravity of the jet device close to or on the line of the spar. The straps 39a for attaching the jet device thus also embrace the jet device in the region of its center of gravity. A sturdy mounting is thus provided, which is of importance in view of the location of the jet at the blade tip and the consequent high centrifugal loads set up.

All the electrical and fluid connections associated with the jet device (43, 44, 48, 49 and 50) are extended inwardly through the structure of the blade to the hub. Preferably these connections are disposed well in advance of the spar 18, a suitable arrangement therefor being indicated in the sectional view of Figure 8. Here it will be seen that the connections extend through a multipart leading edge strip, suitably made of wood as indicated at 51—51. This location of the connections is of advantage in securing a sectional center of gravity location in the blade well forwardly, for instance in the neighborhood of 25% of the chord from the leading edge.

At the hub the connections 44, 43 and 50 for each blade tip jet are flexibly coupled with fluid passages extended downwardly through the hub. As seen in Figure 3, and also in Figure 5, flexible tubes 44a, 43a and 50a are used for this purpose. Each of the connections 50a enters at the top of the hub, communicating with a chamber 52 which in turn communicates with the central vertical tube 53 extending downwardly through the hub. The chamber 52 is formed at the top of a hollow casing 54 which extends upwardly from the rotative hub structure proper. This casing is of multi-part construction as shown and is secured to the hub structure 17 as by studs 55. The central tube 53, and also other concentric, surrounding tubes described hereinafter, are nonrotative. A packing 56 is therefore interposed between the nonrotative tube 53 and the surrounding casing, to provide a fluid pressure seal. Tube 53 is provided with a flexible bellows connection 57 with another tube 53a which extends downwardly from the hub into the body of the craft, as described herebelow. The bellows connection 57 is generally centralized with reference to the center of the spherical bearings 32—33 for the hub, and therefore accommodates movements of the tubes 53 and 53a incident to tilting movement of the hub.

The flexible connection 43a for the fuel supply line communicates with a chamber 58 which in turn has communication with the interior of a tube 59 through a port 60. The lower end of tube 59 is coupled with tube 59a by means of a flexible bellows 61 which surrounds bellows 57 and is also centered with reference to the spherical bearings 32—33, for the purpose described above. The annular passage between tubes 53 and 59 communicates at its lower end with a connection 62 (see Figure 4), which latter is coupled with a fuel supply, as described below.

The flexible tube 44a for the liquid oxygen supply communicates with chamber 63 which in turn communicates with the interior of tube 64 through a port 65. Here again, a flexible bellows 66 serves to interconnect tube 64 with another tube 64a extended downwardly for ultimate communication with the connection 67 (see Figure 4).

Sealing means are provided to prevent leakage of fluid from the annular cavity 58 with which flexible tube 43a communicates. This sealing means includes upper and lower sealing rings 68 and 69, the sealing rings carrying packing adapted to abut against the annular members 70 and 71, respectively. Member 70 is connected with the upper end of tube 59, whereas, member 71 is connected with the upper end of tube 64. Springs 72 and 73 are respectively associated with the rings 68 and 69 to urge them into seating engagement with the members 70 and 71. A pressure-tight bellows 74 interconnects ring 68 with the annular element 75 which defines the upper side of the pressure chamber 58, the element 75 being secured to the upper side of an inwardly projecting annular rib 76 formed within the hollow hub extension 54. A similar bellows 77 interconnects sealing ring 69 with an annular element 78 defining the lower wall of the annular pressure chamber 58. Element 78 is fastened to the underside of the rib 76. A pressure-tight seal is therefore provided as against loss of fluid from the annular pressure chamber 58 into the interior of the hub extension 54. During rotation of the rotor the hub extension 54 and the parts 76, 58, 78, 74, 77, 68, 69, 72 and 73 all rotate together with the rotor, the annular seal members 70 and 71 remaining nonrotative, since these parts are fixed to the central vertically extended pressure tubes.

A similar sealing mechanism is associated with the annular pressure chamber 63 with which the flexible tube 44a communicates, but since the parts are of the same general construction, the description need not be repeated. It is noted, however, that radial bearings 79 and 80 are interposed between the rotative hub extension 54 and the nest of vertically extended tubes lying therein.

Drainage ports 54a and 54b serve to discharge any fluids which may leak past the seals.

The foregoing arrangement of pressure connections, flexible joints and seals provides for transmission of the necessary fluids to the blade tip jets, while accommodating not only rotation of the rotor but also tilting of the rotor about the center point of the spherical bearings 32—33.

From Figures 4 and 2 it will be seen that each of the tubes 53a, 59a and 64a ultimately communicate at their lower ends with connections 81, 82 and 83, respectively, the first (81) being extended to a pressure gauge 84 located for convenient observation by the pilot. The connection 82 is extended into a fuel supply tank 85, and connection 83 is extended into a liquid oxygen supply tank 86. Connection 82 is provided with a shut-off valve 87 and also with a manually controllable valve 88. Similar valves 89 and 90 are provided in the connection 83. The two valves 88 and 90 are adapted to be conjointly opened and closed by a control lever 91 located for convenient access by the pilot.

Means for delivering the fluids from the supply tanks 85 and 86 under pressure through the connections to the blade tip jets may suitably comprise a source of compressed inert gas, for instance, the nitrogen bottle 92, having a connection 93 extended therefrom with branches entering the upper portions of the tanks 85 and 86. A control valve 94 positioned for access by the pilot may be employed for opening and closing the pressure tank.

As may be seen from Figures 6, 3 and 4, the ignition system for the spark plugs 47 of the blade tip jet devices includes the electrical wires 48 and 49 above mentioned, which are extended inwardly through the nose portion of the blade toward the hub and are coupled respectively with slip rings 95 and 96 carried by a ring 97 which is connected with the rotative hub structure 17, the ring 97 being made of insulative material. The rings 95 and 96 are adapted to engage contacts 98 and 99, mounted on an insulative block 100 which is carried by the control ring 34. Wires 101 and 102 are associated with contacts 98 and 99 and are extended downwardly into the body of the aircraft (see Figure 2) for control by a switch 103, the circuit including an appropriate source of current supply indicated at 104.

Various constructional and operational characteristics and advantages of the arrangement described above will appear more clearly from the following remarks:

It is thought that a number of the advantages and characteristics can best be described in relation to a more conventional form of rotative winged aircraft. For this purpose, the arrangement of the invention is compared herebelow with a helicopter of known type in which a mechanical rotor drive is employed, being geared to the rotor hub to transmit the driving force to the blades therethrough. In this known type of helicopter the blades are pivoted to the rotor hub by means of pivots providing at least for flapping movement of the blades, and provision is frequently made for manual control of the mean pitch angle of the rotor blades as well as of cyclic or periodic pitch change. The mean pitch control is utilized at least in part to control the rate of ascent or descent, and also to provide for pitch reduction into the autorotative range, so that, in the event of failure of the mechanical rotor drive, the rotor will autorotate and thus bring the aircraft safely to earth. The cyclic pitch control is utilized for maneuvering the aircraft, i. e., for setting up control moments in pitch and in roll. Such known type of helicopters still further require provision of special means for counteracting the rotor driving torque, for instance, an airscrew mounted at the tail of the aircraft so as to impose a lateral thrust on the body in a direction opposing the tendency of the body to counter-rotate under the influence of the rotor drive.

In the form of helicopter just mentioned by way of comparison, the autorotative speed of the rotor customarily does not differ appreciably from the driven speed. Most usually, the autorotative speed is a rate slightly lower than the driven speed, but may even be somewhat higher, depending upon the aerodynamic design of the rotor. This relationship between autorotative speed and driven speed of the known type of helicopter rotor is of importance for various reasons, including, especially, a number of considerations which affect rotor efficiency, such as the need for maintaining a blade tip speed suitable for developing effective lift without excessive aerodynamic tip losses and high profile drag losses under both autorotative and driven conditions.

In consequence of the above mentioned relationship between autorotative speed and driven speed of the comparative helicopter referred to, little if any difference exists in coning angle as between the conditions of autorotation and power drive. Therefore, even the employment of delta-3 flapping hinges in such a rotor would not result in appreciable pitch change of the blade as between conditions of autorotation and power drive. Such a helicopter requires a large degree of pitch increase for helicopter operation to efficiently absorb the engine power applied to the rotor. For example, a pitch angle of 4½°–5½° might be suitable for autorotative conditions, whereas to absorb normal power when the rotor is driven through the hub would require an increase in pitch to around 12°.

In contrast with the foregoing, for an aircraft of given weight, the present invention contemplates employment of a rotor of relatively larger diameter and consequently lower disc loading, and further having blade tip jet devices for effecting driven operation of the rotor. The characteristics of the rotor constructed according to this invention, moreover, are such that during jet drive a very much higher rotational speed prevails, than in the condition of autorotation. One effect of this difference is that the blade tip speed is brought into the range in which such jets operate at relatively high efficiency.

Beyond the foregoing, with delta-3 flapping hinges for the blades, as is contemplated by the present invention, the difference in rotational speed of the rotor between conditions of autorotation and jet drive results in a substantial variation in coning angle of the rotor blades as between these two conditions of operation, and this, because of the obliquity of the delta-3 flapping pivots, brings about a much larger extent of blade pitch angle change than is practicable in a rotor mechanically driven through its hub and having little if any difference in rotative speed as between the conditions of autorotation and power drive. For the above purpose it is proposed to employ a delta-3 inclination of the flapping pivot wherein the included angle between the pivot axis and the blade axis at the leading side is from 60° to 70°.

Still further, since appreciable difference in rotative speed is contemplated as between the conditions of autorotation and power drive, the extent of pitch change required to secure the desired lift value during jet drive of the rotor is not as great as in the case of a mechanically driven rotor, having only a minor difference in rotative speed as between the two conditions of operation. To illustrate, whereas in the comparative helicopter above referred to a typical range of pitch change would be from about 5° (for autorotation) up to about 12° (for power drive), with the system of the present invention, a pitch change of only one or two degrees is required since the greatly increased jet driven speed results in greatly increased lift without the necessity for an extensive raising of the blade pitch.

As illustrative of the relationship between autorotative speed and jet driven speed in a rotor system constructed according to this invention, it may be said that the present invention contemplates an increase in blade tip speed for the condition of jet drive equal to from about 50% to about 100% of the blade tip speed for autorotative operation. As an illustrative example in absolute figures, in a typical aircraft of 2500 pounds gross weight, constructed according to the present invention, the rotor may be of about 40 feet diameter and have an autorotative blade tip speed of about 400 feet per second, and a jet driven blade speed of about 650 feet per second.

It is also to be noted that in accordance with the present invention, it is contemplated that pitch change journals or mountings for the blades (i. e. pitch change pivots having axes coincident with the longitudinal axes of the blades) should be eliminated. Such pitch change mountings have frequently been employed in prior helicopters to provide for cyclic pitch variation of the blades for control purposes and also to provide for adjustment of the mean or average pitch of the blades, for instance, when the condition of operation is changed from that of power drive to that of autorotation.

Since a considerably higher jet driven rotational speed is contemplated according to the present invention, and further since the invention utilizes jet devices mounted at the tips of the blades, the centrifugal loads are appreciably greater than in a comparative helicopter of the type above described. The presence of such heavy centrifugal loads and such rapid oscillation of the blades during feathering at high R. P. M. introduces problems not only in the blade mountings but also in the pitch control system, resulting in fluctuating torsional loads therein of such magnitude as to make it difficult to manually operate the control. For these and other reasons, it is preferred, according to this invention, to employ a control system other than that requiring pitch pivots for the blades, and to this end the invention preferably utilizes a tiltable mounted hub, for instance of the type fully described above and illustrated in the drawings. In such a system, torsional loads as between blades are balanced out or neutralized in the rotative hub structure itself and are not transmitted to the control system.

According to the foregoing, a rotative winged aircraft is provided, capable either of driven operation (by jet reaction) or of autorotative operation, this being achieved by employment of a rotor system greatly simplified and having distinctive operational advantages, as compared with other rotor systems heretofore proposed for use in rotative winged aircraft capable of both driven and autorotative operation. Note, for example, that blade pitch change as between the conditions of autorotative and power drive is effected automatically under the influence of change in coning angle as between the two conditions of operation. Note further that special torque counteracting means, such as the so-called "tail" or "torque" rotor are not required, the system of jet drive at the blade tips being such as does not impose any counterrotative force upon the body of the aircraft. Still further, the conversion from driven to autorotational operation requires no disconnectible transmission or clutch, such as used in a hub-driven rotor.

The aircraft constructed according to the present invention is also much safer and simpler to operate, particularly since it does not require any manual control of the mean blade pitch angle. Under flight conditions without power relatively lower speeds both as to gliding and settling are obtained due to the lower disc loading which can be used with this arrangement.

From the above it will be seen that in an aircraft arranged according to the invention only a small increase in blade pitch is required for helicopter operation, as compared to autorotative operation because of the fact that a large increase in rotor R. P. M. is used for helicopter operation. The required small increase in blade pitch can readily be obtained with a simple delta-3 angle for the flapping hinge of the order of 30° or less (measured with relation to the perpendicular hinge position); which is in contrast with a helicopter rotor driven through its hub, which requires more complicated mechanism in the blade mounting or alternatively, an excessively large delta-3 angle in the flapping hinge in order to absorb the power during driven operation. The employment of relatively complicated blade mounting mechanism obviously has its disadvantages and it may further be mentioned that an excessively large delta-3 angle is also objectionable from certain standpoints, especially during autorotative operation. Excessively large delta-3 angles tend to introduce blade bending and also adversely influence the smoothness of the rotor.

I claim:

In a rotative winged aircraft, a blade having a primary longitudinal structural element extended substantially throughout the length of the blade, a jet driving device for the blade positioned adjacent the outer end of the blade being of elongated shape in a direction transverse the axis of said main longitudinal structural element, the jet device being secured to the said structural element of the blade in the region intermediate the fore and aft ends of the jet device, and the blade further having a rounded tip projecting radially beyond the jet device and connected with the main longitudinal structural element of the blade in association with the jet device.

PAUL H. STANLEY.

REFERENCES CITED

The following references are of record in the file of this patent:

UNITED STATES PATENTS

| Number | Name | Date |
| --- | --- | --- |
| 1,569,607 | Beck | Jan. 12, 1926 |
| 1,820,946 | Pitcairn | Sept. 1, 1931 |
| 1,897,092 | Weir | Feb. 14, 1933 |
| 2,114,808 | Pitcairn | Apr. 19, 1938 |
| 2,122,450 | Campbell | July 5, 1938 |
| 2,142,601 | Bleecker | Jan. 3, 1939 |
| 2,193,498 | Stanley | Mar. 12, 1940 |
| 2,250,826 | Everts | July 29, 1941 |
| 2,264,942 | Larsen | Dec. 2, 1941 |
| 2,311,247 | Pitcairn | Feb. 16, 1943 |
| 2,330,056 | Howard | Sept. 21, 1943 |
| 2,397,357 | Kundig | Mar. 26, 1946 |

FOREIGN PATENTS

| Number | Country | Date |
| --- | --- | --- |
| 227,151 | Great Britain | Jan. 12, 1925 |
| 366,450 | Great Britain | July 30, 1930 |
| 648,107 | France | Aug. 7, 1928 |
| 795,517 | France | Jan. 8, 1936 |
| 838,828 | France | Dec. 16, 1938 |